US012785198B2

(12) United States Patent
Harris et al.

(10) Patent No.: US 12,785,198 B2
(45) Date of Patent: Nov. 3, 2026

(54) BATTERY PACK FRAME ASSEMBLIES

(71) Applicant: Toyota Motor Engineering & Manufacturing North America, Inc., Plano, TX (US)

(72) Inventors: Ryan C. Harris, Saline, MI (US); Todd Muck, Fowlerville, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 607 days.

(21) Appl. No.: 18/225,876

(22) Filed: Jul. 25, 2023

(65) Prior Publication Data

US 2025/0038338 A1 Jan. 30, 2025

(51) Int. Cl.

| | |
|---|---|
| ***H01M 50/289*** | (2021.01) |
| ***H01M 50/224*** | (2021.01) |
| ***H01M 50/229*** | (2021.01) |
| ***H01M 50/262*** | (2021.01) |

(52) U.S. Cl.

CPC ....... *H01M 50/289* (2021.01); *H01M 50/224* (2021.01); *H01M 50/229* (2021.01); *H01M 50/262* (2021.01)

(58) Field of Classification Search

None

See application file for complete search history.

(56) References Cited

U.S. PATENT DOCUMENTS

| | | | | |
|---|---|---|---|---|
| 8,778,519 | B1 | 7/2014 | Frey et al. | |
| 10,044,018 | B2 * | 8/2018 | Soleski | B60L 58/21 |
| 10,476,060 | B1 | 11/2019 | Smith | |
| 2004/0256888 | A1 * | 12/2004 | Le Gall | B62D 29/002 296/187.02 |
| 2006/0286441 | A1 * | 12/2006 | Matsuoka | H01M 50/213 429/97 |
| 2016/0007759 | A1 * | 1/2016 | Polevoy | A47C 19/005 5/400 |
| 2017/0211272 | A1 * | 7/2017 | Cullinan | E04H 17/1413 |
| 2020/0148066 | A1 | 5/2020 | Sekar et al. | |
| 2022/0006150 | A1 * | 1/2022 | Foran | H01M 50/227 |
| 2022/0266701 | A1 * | 8/2022 | Collins | H01M 50/249 |
| 2023/0264579 | A1 * | 8/2023 | Sekar | H01M 50/20 429/100 |
| 2023/0307767 | A1 * | 9/2023 | Toda | H01M 50/224 |
| 2024/0047802 | A1 * | 2/2024 | Wang | H01M 10/4207 |

FOREIGN PATENT DOCUMENTS

| | | | |
|---|---|---|---|
| CN | 115257970 | A | 11/2022 |
| JP | 2021088264 | A | 6/2021 |
| KR | 20210001334 | A | 1/2021 |

* cited by examiner

*Primary Examiner* — Kevin M Bernatz

(74) *Attorney, Agent, or Firm* — Dinsmore & Shohl, LLP

(57) ABSTRACT

A battery pack frame is disclosed. The battery pack frame includes a front wall, a rear wall, and a pair of sidewalls that extend between the front wall and the rear wall. A bottom plate extends beneath the front wall, the rear wall, and the pair of sidewalls, and a plurality of cross members extend between the pair of sidewalls. Each of the plurality of cross members further include an upper member and a base member having a channel that defines a cavity for receiving the upper member.

9 Claims, 3 Drawing Sheets

BATTERY PACK FRAME ASSEMBLIES

TECHNICAL FIELD

The present specification generally relates to battery pack frame assemblies and, more specifically, to battery pack frame assemblies having internal cross members.

BACKGROUND

Traditional vehicular battery pack frame assemblies may contain internal cross members that are used to distribute a crash load and protect battery modules during a crash event. In many cases, the internal cross members are made of extruded aluminum or cold rolled steel. However, this structure is often heavy and difficult to manufacture. Accordingly, a need exists for battery pack frame assemblies that are able to distribute a crash load while reducing weight and being easy to manufacture.

SUMMARY

In one embodiment, a battery pack frame is disclosed. The battery pack frame includes a front wall, a rear wall, and a pair of sidewalls that extend between the front wall and the rear wall. A bottom plate extends beneath the front wall, the rear wall, and the pair of sidewalls, and a plurality of cross members extend between the pair of sidewalls. Each of the plurality of cross members further include an upper member and a base member having a channel that defines a cavity for receiving the upper member.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
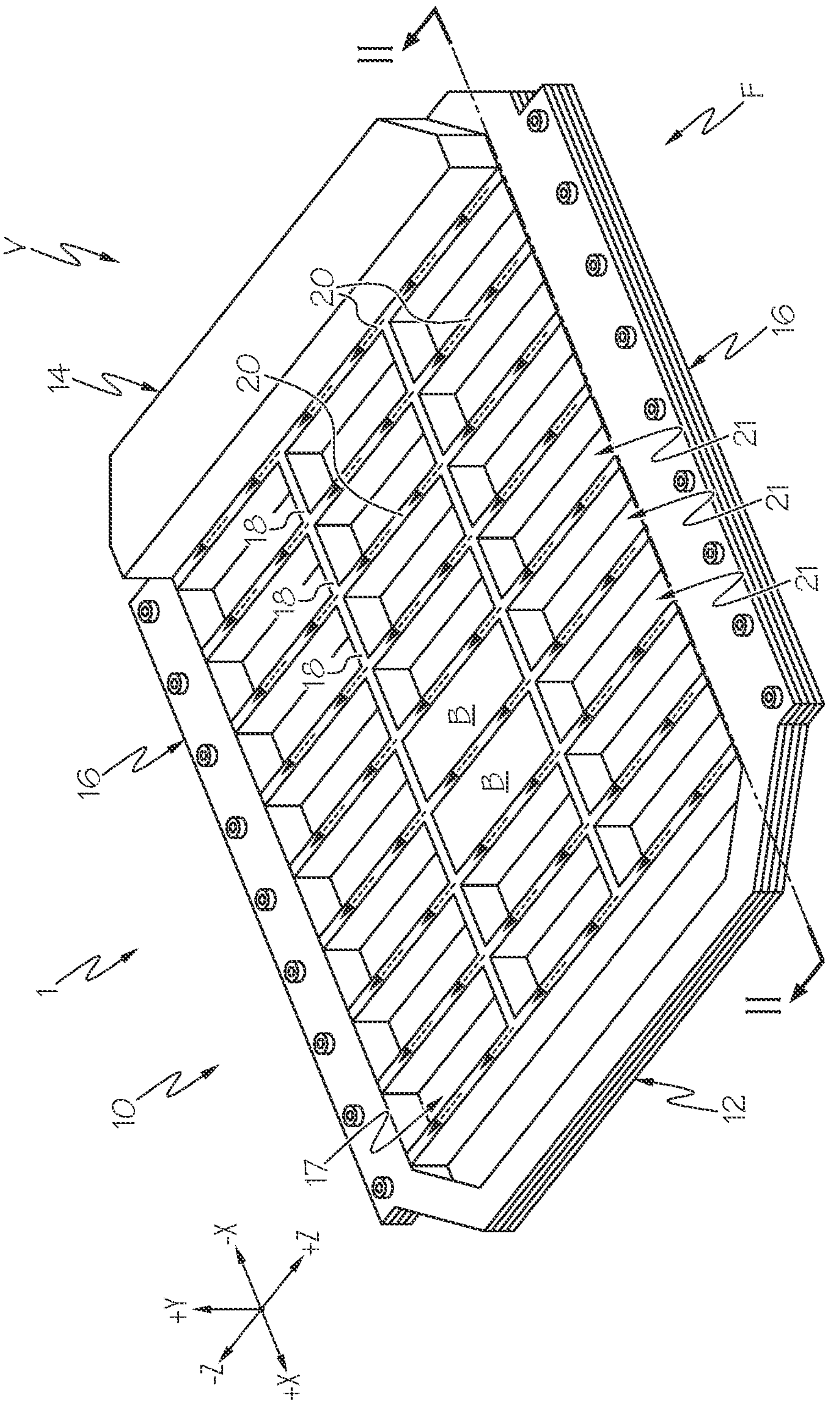
FIG. 1 schematically depicts a perspective view of a battery pack frame, according to one or more embodiments described and illustrated herein.

Embodiments described herein are generally directed to vehicular battery pack frame assemblies having a plurality of cross members that each include an upper member and a base member that are coupled together using a foam material or fastener. The plurality of cross members may provide additional rigidity to the battery pack frame of the vehicle, such that, in the event of a crash, the crash load is more evenly distributed across the battery pack frame.

As will be described in additional detail herein, the battery pack frame assemblies include a front wall, a rear wall, and a pair of side walls extending between the front wall and the rear wall. Each of the pair of side walls include a pair of sidewalls, a top wall, and a bottom wall, with the pair of side walls, the top wall, and the bottom wall defining the cavity of the battery pack frame. The insert is disposed within the cavity, and includes a plurality of ridges and a plurality of valleys.

Various embodiments of battery pack frame assemblies are described in detail below. Whenever possible, the same reference numerals will be used throughout the drawings to refer to the same or like parts.

Various embodiments of battery pack frame assemblies are described in detail below. Whenever possible, the same reference numerals will be used throughout the drawings to refer to the same or like parts. As used herein, the term "vehicle longitudinal direction" refers to the forward-rearward direction of the vehicle (i.e., in the +/−vehicle X-direction as depicted). The term "vehicle lateral direction" refers to the cross-vehicle direction of the vehicle (i.e., in the +/−vehicle Z-direction as depicted), and is transverse to the vehicle longitudinal direction. The term "vehicle vertical direction" refers to the upward-downward direction of the vehicle (i.e., in the +/−vehicle Y-direction as depicted). Further, the terms "upward," "downward," "rearward," and "forward" are used to describe the relative positioning of various components of the vehicle relative to one another. Because the vehicle structures may be generally symmetrical about the vehicle centerline, the terms "upward," "downward," "rearward," and "forward" may be switched when evaluating components positioned along opposite sides of the vehicle. Further, while certain components of the vehicle are described as extending in one of the identified directions or oriented toward one of the identified directions, it should be understood that these components extend or are oriented in at least these recited directions.

Referring now to FIG. 1, a vehicle V having a battery pack frame assembly 1 is illustrated. As illustrated in FIG. 1, the battery pack frame assembly 1 may include a battery pack frame 10 and a plurality of batteries B disposed within the battery pack frame 10. The battery pack frame 10 may include a front wall 12, a rear wall 14, and a pair of sidewalls 16 that extend between ends of the front wall 12 and the rear wall 14. The battery pack frame 10 may further include a bottom plate 17 that extends between and beneath (e.g., in the −y-direction as depicted in the coordinate axis of FIG. 1) the front wall 12, rear wall 14, and the pair of sidewalls 16. In some embodiments, the bottom plate 17 may be a cooling plate or other similar mechanism capable of cooling the plurality of batteries B disposed within the battery pack frame assembly 1.

As further depicted in FIG. 1, the front wall 12 is arranged frontward of the rear wall 14, but it should be understood that the front wall 12 and the rear wall 14 may similarly be arranged in a reversed orientation without departing from the scope of the present disclosure. In these embodiments, the front wall 12, the rear wall 14, and the pair of side walls 16 may be formed of aluminum, steel (e.g., cold rolled steel) or any similar material.

The battery pack frame 10 further includes a plurality of longitudinal intermediate cross members 18 and a plurality of cross members 20, such as a plurality of traverse intermediate cross members. The plurality of longitudinal intermediate cross members 18 extend between the front wall 12 and the rear wall 14. The plurality of cross members 20 extend between the pair of sidewalls 16. The plurality of longitudinal intermediate cross members 18 intersect with the plurality of cross members 20 to form cavities 22 that receive the batteries B of the battery pack frame assembly 1.

In operation, the battery pack frame assembly 1 allows for a force F, such as a vehicular side crash load, to be transferred from an exterior side of one of the pair of sidewalls 16 to the other of the pair of sidewalls 16 via the plurality of cross members 20. For example, as depicted in FIG. 1, when the force F is applied to one of the sidewalls 16, the force F may be transferred in the vehicle lateral direction (e.g. in the −z-direction as depicted in the coordinate axis of FIG. 1) from the one sidewall 16 receiving the force F to the opposing sidewall 16 via the plurality of cross members 20. By transferring the force F between the pair of sidewalls 16, the force may be more evenly distributed across the battery pack frame 10, and deformations within the battery pack frame 10 may be minimized such that the plurality of batteries B may remain secured within the battery pack frame 10.

Figure 2A:
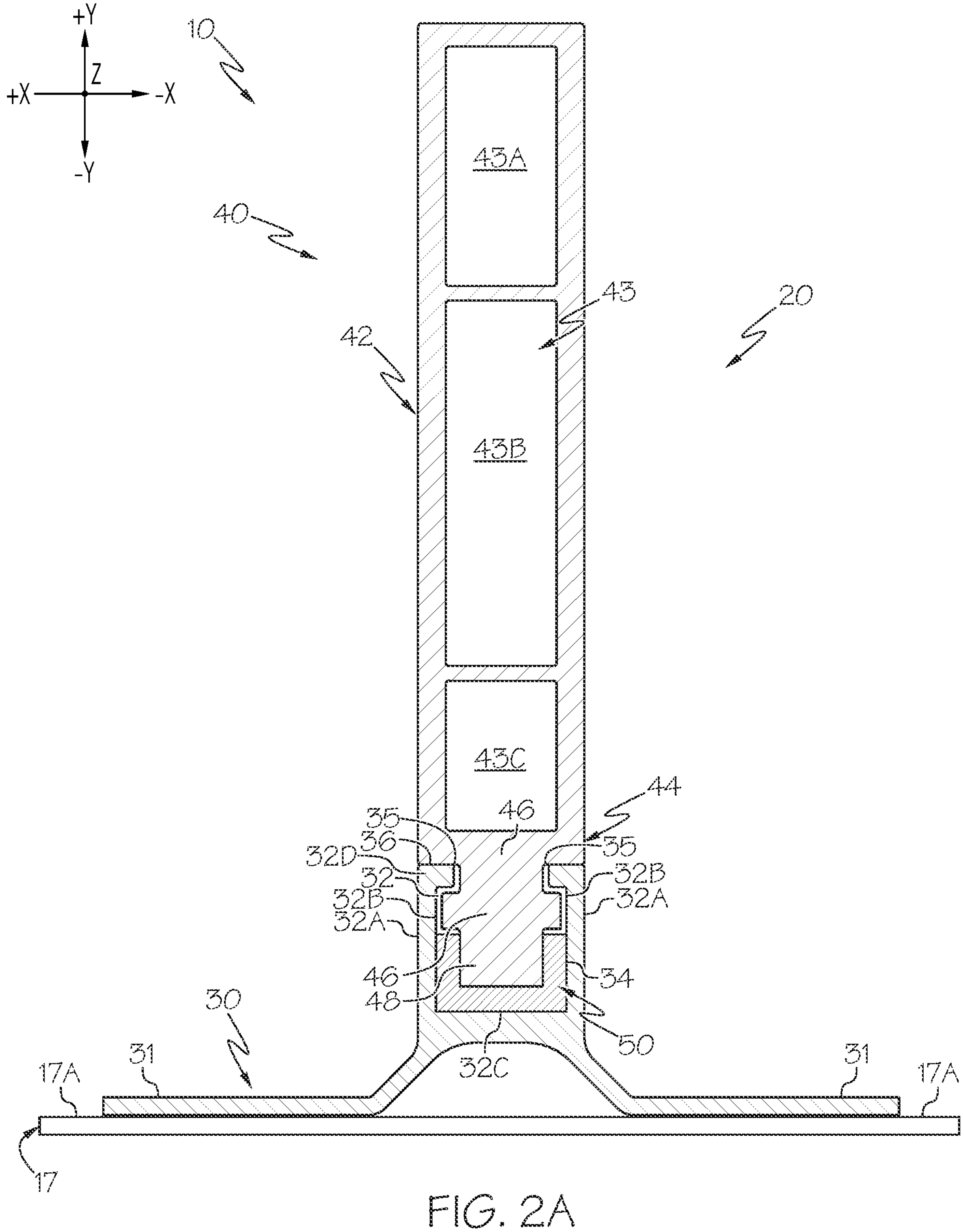
FIG. 2A schematically depicts a partial cross-sectional view of an embodiment of the battery pack frame taken along line II-II of FIG. 1, according to one or more embodiments described and illustrated herein.
Figure 2B:
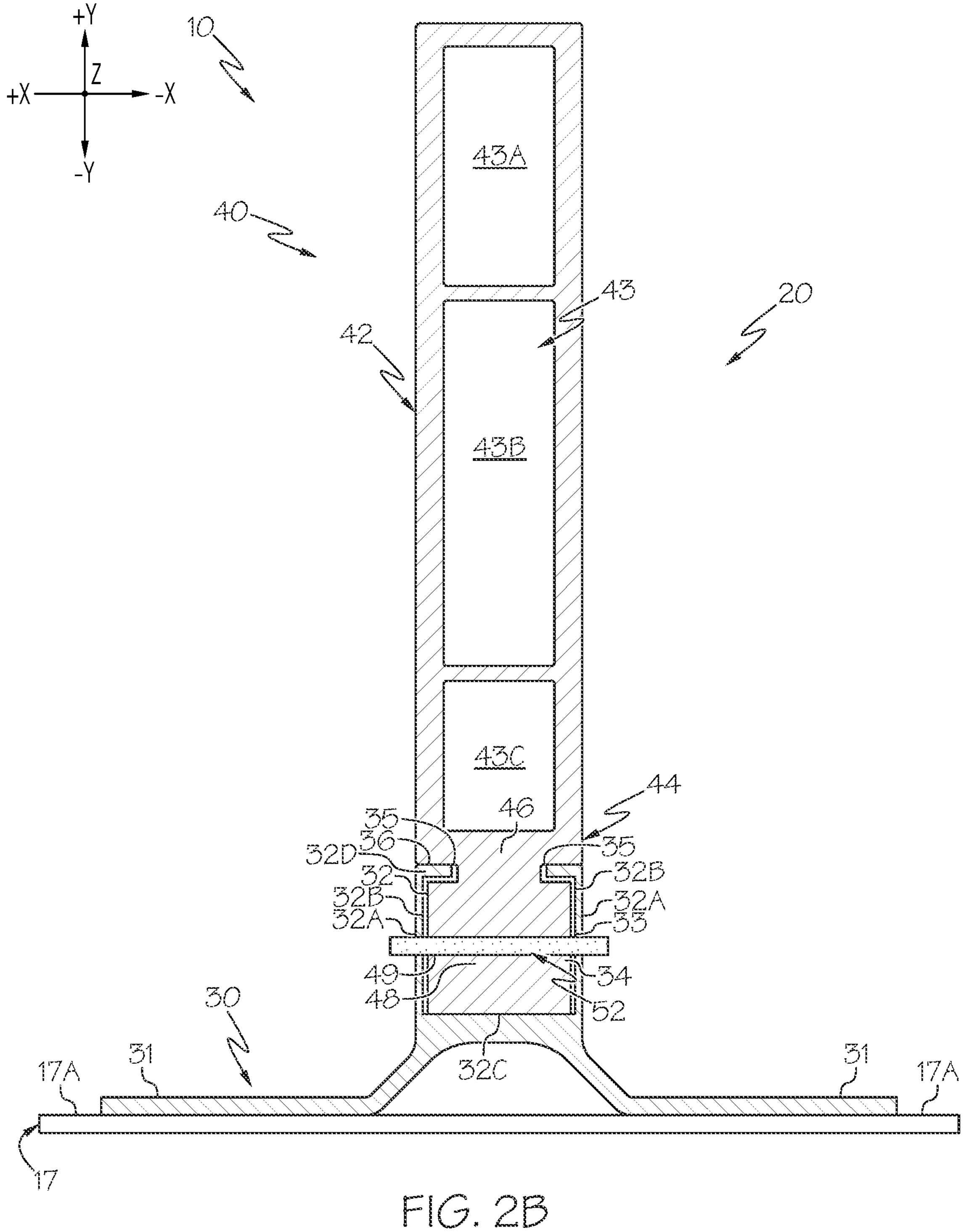
FIG. 2B schematically depicts a partial cross-sectional view of another embodiment of the battery pack frame taken along line II-II of FIG. 1, according to one or more embodiments described and illustrated herein.

Referring now to FIGS. 2A and 2B, each of the plurality of cross members 20 may further include a base member 30 and an upper member 40 that are coupled together to form each of the plurality of cross members 20, as will be described in additional detail herein. In these embodiments, the base member 30 may be an extruded base member that may be fixedly coupled (e.g., via welding, etc.) to the bottom plate 17 of the battery pack frame 10. More particularly, the base member 30 may include a plurality of flanges 31 that may be secured to an upper surface 17*a* of the bottom plate (e.g., via welding, etc.) to secure the base member 30 to the bottom plate 17. The base member 30 may be formed of aluminum, steel (e.g., cold rolled and/or stainless steel), magnesium alloys, carbon fiber reinforced polymers, and/or any other similar materials without departing from the scope of the present disclosure. In these embodiments, the base member 30 may further include As further depicted in FIGS. 2A and 2B, the base member 30 may include a channel 32 that extends along a length of the base member 30 (e.g., in the +/−z-direction as depicted in the coordinate axes of FIGS. 2A and 2B). The channel 32 may include exterior surfaces 32A, interior surfaces 32B, a lower surface 32C, and an upper surface 32D, with the interior surfaces 32B and lower surface 32C defining a cavity 34. In these embodiments, the upper surface 32D may include a pair of tabs 35 that extend inwardly from the upper surface 32D of the channel 32 and define a narrowed opening 36 within the cavity 34. In these embodiments, the narrowed opening 36 may have a width that is less than a width of the cavity, and may be configured to receive the upper member 40 of the plurality of cross members 20, as will be described in additional detail herein.

Referring still to FIGS. 2A and 2B, the upper member 40 of each of the plurality of cross members 20 may be a composite pultrusion upper member. In these embodiments, the upper member 40 may further include an upper portion 42 and a lower portion 44, with the upper portion 42 including a plurality of openings 43, and the lower portion 44 having a narrowed section 46 and a widened section 48. As depicted in FIGS. 2A and 2B, each of the plurality of openings 43 may extend along a length of the upper member 40 (e.g., in the +/−z-direction as depicted in the coordinate axes of FIGS. 2A and 2B).

In these embodiments, the upper member 40 may be inserted into the channel 32 of the base member 30 such that the widened section 48 of the upper member 40 is received within the cavity 34 and the narrowed section 46 of the upper member 40 is received within the narrowed opening 36 of the base member 30. It should be appreciated that the upper member 40 may be inserted into the channel 32 by translating the upper member 40 in the traverse direction (e.g., in the +/−z-direction as depicted in FIGS. 2A and 2B). For example, the upper member 40 may be inserted into the channel 32 of the base member 30 to form each of the plurality of cross members 20. The plurality of cross members 20 may then be secured to the battery pack frame 10 by fixedly coupling the base member 30 to the bottom plate 17 of the battery pack frame 10, as has been described herein.

In these embodiments, it should be appreciated that, after the upper member 40 is inserted into the channel 32 of the base member 30 (e.g., by sliding the upper member 40 into the channel 32 from the side), the widened section 48 of the upper member 40 may prevent the upper member 40 from moving in a vertical direction (e.g., in the +y-direction as depicted in the coordinate axes of FIGS. 2A and 2B) with respect to the base member 30. For example, the widened section 48 of the upper member 40 has a width that is larger than the width of the narrowed opening 36, and the narrowed section 46 of the upper member 40 has a width that is smaller than the width of the narrowed opening 36 and widened section 48 of the upper member 40. Accordingly, the widened section 48 of the upper member 40 may contact the narrowed opening 36 of the cavity 34 defined by the channel 32 of the base member 30, which may ensure that the upper member 40 cannot translate in the vertical direction.

Referring still to FIGS. 2A and 2B, the upper member 40 may be formed of a continuous fiber reinforced resin material. In some embodiments, the upper member 40 may include a resin composite material and one or more fibers extending in one direction. As a non-limiting example, the one or more fibers may be glass fibers such as continuous glass fibers. As another non-limiting example, the one or more fibers may be glass fibers and nylon fibers (e.g., 95% of the one or more fibers are glass fibers, and 5% of the one or more fibers are nylon fibers). The one or more fibers may be configured to reinforce the resin composite material (e.g., resins such as epoxy, polyester, etc.) of the upper member 40. As such, the glass fibers may increase a tensile strength, flex modulus, impact resistance, and dimensional stability of the upper member 40. In further embodiments, the upper member 40 is formed of a continuous glass fiber reinforced resin material.

In the embodiments described herein, the upper member 40 may be formed using a continuous molding pultrusion process in which the reinforcing fibers, such as long strand glass-fibers, are saturated with a liquid resin material, such as a liquid polymer resin, then pulled through a heated forming die to create the upper member 40 (including narrowed section 46 and widened section 48). In some embodiments, pigments and catalysts that enhance the curing of the upper member 40 may be added while the one or more continuous glass fibers are saturated with the liquid resin material. However, it should be understood that the upper member 40 may be formed using any suitable pultrusion process or other suitable manufacturing process in other embodiments without departing from the scope of the present disclosure.

Referring now to FIG. 2A, each of the plurality of cross members 20 may further include a foam material 50, such as an expandable adhesive foam, that may be inserted into the cavity 34 defined by the channel 32 in order to secure the upper member 40 within the channel 32 of the base member 30. In these embodiments, the foam material 50 may be inserted into vacant space within the cavity 34 of the channel 32 of the base member 30 that is unoccupied by the upper member 40. For example, the foam material 50 may be inserted into the cavity 34 such that the foam material 50 surrounds the upper member 40 and at least partially fills the cavity 34. As depicted in FIG. 2A, the foam material 50 may be inserted into the cavity such that the foam material 50 extends between the interior surfaces 32B of the channel 32 in the longitudinal direction (e.g., in the +/−x-direction as depicted in the coordinate axis of FIG. 2A) and between the upper member 40 and the interior surfaces 32B in a lateral direction (e.g., in the +/−y-direction as depicted in FIG. 2A). Upon bonding of the base member 30 and the upper member 40, each of the plurality of cross members 20 may be configured to act as a single piece, monolithic structure when a load is applied. In these embodiments, it should be appreciate that the upper member 40 may be responsible for distributing a load applied to the cross member 20 in the lateral direction.

In the embodiments described herein, a variety of foam material 50 may be utilized within the cavity 34 to secure the upper member 40 to the base member 30. In these embodiments, the foam material 50 utilized within the cavity 34 may be determined based on a load distributed across the battery pack frame 10. For example, the density of the foam material 50 utilized within the cavity 34 may be proportional to the load distributed across the battery pack frame 10. In these embodiments, a battery pack frame 10 subjected to a greater load may require a higher density foam material 50 within the cavity 34 to ensure that the upper member 40 remains secured to the base member 30 when the load is applied to the battery pack frame 10.

For example, the foam material 50 may include a high energy absorption foam, such as a polyurethane foam. In these embodiments, the foam material 50 may have a density between 0.1-1.0 g/cm$^3$, such as between 0.1-0.7 g/cm3. In other embodiments, the foam material 50 may include a structural foam, such as a polyamide particle foam. In these embodiments, the foam material 50 may have a density between 250-400 g/L, such as between 290-350 g/L. However, it should be understood that the embodiments described herein are intended to be exemplary in nature, and the foam material 50 may include any material of any density without departing from the scope of the present disclosure.

Although not depicted herein, it should be further appreciated that, in some embodiments, the foam material 50 may also be disposed within the plurality of openings 43 of the upper portion 42 of the upper member 40. In these embodiments, the foam material 50 disposed within the plurality of openings 43 may be the same foam material 50 that is disposed within the cavity 34 of the base member 30. However, in some embodiments, the plurality of openings 43 may receive a different foam material 50 than the foam material disposed within the cavity 34 of the base member 30. For example, the cavity 34 may include a first foam having a first density while the plurality of openings 43 may include a second foam having a second density different from the first density of the first foam. Furthermore, it should be appreciated that, in some embodiments, each of the plurality of openings 43 may include a different foam material. For example, a first opening 43A of the plurality of openings 43 may include a first foam material having a first density, a second opening 43B of the plurality of openings 43 may include a second foam having a second density different from the first density of the first foam, and a third opening 43C of the plurality of openings 43 may include a third foam having a third density different from the first density of the first foam and the second density of the second foam.

In the embodiments described herein, the foam material 50 may act to retain the upper member 40 in a predetermined position, thereby reducing noise and vibration within the cross member 20. Furthermore, in these embodiments, the foam material 50 may be a heat activated foam material 50 that expands in size after being heated (e.g., via an external heat source) to above a predetermined temperature, such that the foam material 50 may be inserted into the cavity 34 prior to inserting the upper member 40 into the cavity 34. Although the foam material 50 may be inserted into the cavity 34 before the upper member 40, it should be appreciated that, in other embodiments, the upper member 40 may be inserted into the cavity 40 before the foam material 50.

Referring now to FIG. 2B, in some embodiments, the plurality of cross members 20 may further include a fastener 52 used to fixedly couple the upper member 40 to the base member 30 of each of the plurality of cross members 20. In these embodiments, the channel 32 of the base member 30 may further include a channel hole 33 that extends through the exterior surfaces 32A and the interior surfaces 32B of the channel 32 (e.g., in the +/−x-direction as depicted in the coordinate axis of FIG. 2B).

In order to couple the upper member 40 to the base member 30, the widened section 48 of the lower portion 44 of the upper member 40 may further include a widened section hole 49. In these embodiments, the widened section hole 49 may extend through a width of the widened section 48 (e.g., in the +/−x-direction as depicted in the coordinate axis of FIG. 2A), such that the widened section hole 49 aligns (e.g., in the +/−y-direction as depicted in the coordinate axis of FIG. 2B) with the channel hole 33 when the upper member 40 is inserted into the base member 30. With the widened section hole 49 and the channel hole 33 aligned, the fastener 52 may be inserted through the channel hole 33 and the widened section hole 49 to secure the upper member 40 to the base member 30. In the embodiments described herein, the fastener 52 may include a pin, such as a dowel pin, clevis pin, taper pin, spring pin, hitch pins, grooved pin, or any other similar fastener.

Although not depicted, it should be further appreciated that, in some embodiments, each of the plurality of cross members 20 may include both the foam material 50 and fastener 52. For example, in embodiments in which the widened section 48 of the lower portion 44 of the upper member 40 does not fully occupy the cavity 34 defined by the channel 32 of the base member 30, the fastener 52 may be inserted through the channel 32 and the widened section 48 of the lower portion of the upper member 40 while the foam material 50 may be used to fill any remaining vacant space within the cavity 34.

It should now be understood that embodiments of the present disclosure are directed to battery pack frames including a plurality of cross members that each include an upper member, a base member, and a foam material or fastener for securing the upper member within a cavity of the base member. The plurality of cross members act to increase the rigidity of the battery pack frame, such that the battery pack frame is capable of withstanding loads caused by vehicle crashes without buckling or undergoing similar deformation.

It is noted that the terms “substantially” and “about” may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

It will be apparent to those skilled in the art that various modifications and variations can be made to the embodiments described herein without departing from the scope of the claimed subject matter. Thus, it is intended that the specification cover the modifications and variations of the various embodiments described herein provided such modification and variations come within the scope of the appended claims and their equivalents.

What is claimed:

1. A battery pack frame comprising:

a front wall;

a rear wall;

a pair of sidewalls extending between the front wall and the rear wall;

a bottom plate extending beneath the front wall, the rear wall, and the pair of sidewalls; and a plurality of cross members extending between the pair of sidewalls, each of the plurality of cross members further comprising:

an upper member; and a base member extending lengthwise between a pair of ends, the base member having a channel that defines a cavity for receiving the upper member, the cavity defined by the channel extending to the pair of ends and configured to receive the upper member therein at one of the pair of ends, the cavity defined by the channel further including a narrowed opening that extends between the pair of ends.

2. The battery pack frame of claim 1, further comprising a foam disposed between an interior surface of the cavity and the upper member to secure the upper member to the base member.

3. The battery pack frame of claim 2, wherein the foam is an expandable adhesive foam.

4. The battery pack frame of claim 1, further comprising a fastener that extends through the base member to secure the upper member to the base member.

5. The battery pack frame of claim 1, wherein the base member is an aluminum extruded base member.

6. The battery pack frame of claim 1, wherein the upper member is a pultruded composite upper member.

7. The battery pack frame of claim 1, wherein the base member of each of the plurality of cross members is secured to the bottom plate to couple each of the plurality of cross members to the battery pack frame.

8. The battery pack frame of claim 1, wherein the upper member of each of the plurality of cross members further includes a lower portion and an upper portion, the lower portion having a narrowed section and a widened section.

9. The battery pack frame of claim 8, wherein the narrowed opening of the cavity receives the narrowed section of the upper member and the widened section of the upper member prevents movement of the upper member in a vertical direction with respect to the base member.

* * * * *